(12) United States Patent
Karger

(10) Patent No.: US 12,145,322 B2
(45) Date of Patent: Nov. 19, 2024

(54) TOOL FOR WELDING A LIGHT PANE TO A HOUSING OF A MOTOR VEHICLE LIGHT

(71) Applicant: HELLA GmbH & Co. KGaA, Lippstadt (DE)

(72) Inventor: Odo Karger, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 13 days.

(21) Appl. No.: 17/567,475

(22) Filed: Jan. 3, 2022

(65) Prior Publication Data

US 2022/0118714 A1 Apr. 21, 2022

Related U.S. Application Data

(63) Continuation of application No. PCT/EP2020/067832, filed on Jun. 25, 2020.

(30) Foreign Application Priority Data

Jul. 3, 2019 (DE) .................... 10 2019 117 950 U

(51) Int. Cl.
*B29C 65/04* (2006.01)
*B29C 65/00* (2006.01)
*B29L 31/00* (2006.01)
*B29L 31/30* (2006.01)

(52) U.S. Cl.
CPC ............ *B29C 65/04* (2013.01); *B29C 66/131* (2013.01); *B29C 66/83* (2013.01); *B29L 2031/30* (2013.01); *B29L 2031/747* (2013.01)

(58) Field of Classification Search
CPC ... B29C 65/04; B29C 65/1432; B29C 66/131; B29C 66/83; B29C 66/542; B29L 2031/03
See application file for complete search history.

(56) References Cited

U.S. PATENT DOCUMENTS

| | | | |
|---|---|---|---|
| 5,466,316 A * | 11/1995 | Hardigg | B29C 66/8242 156/308.4 |
| 10,220,572 B2 | 3/2019 | Knecht et al. | |
| 2002/0057578 A1 | 5/2002 | Kageyama et al. | |
| 2005/0259433 A1* | 11/2005 | Nishizaki | B29C 65/1432 362/520 |
| 2016/0096314 A1* | 4/2016 | Wacker | B29C 65/1432 156/361 |
| 2016/0107372 A1* | 4/2016 | Knecht | B29C 66/54 156/499 |
| 2019/0016062 A1* | 1/2019 | Choi | B29C 65/1412 |

FOREIGN PATENT DOCUMENTS

| | | |
|---|---|---|
| DE | 102016109985 A1 | 11/2017 |
| EP | 0230495 A1 | 8/1987 |
| EP | 3009254 A2 | 4/2016 |

OTHER PUBLICATIONS

International Search Report dated Sep. 14, 2020 in corresponding application dated PCT/EP2020/067832.

\* cited by examiner

*Primary Examiner* — Daniel McNally
(74) *Attorney, Agent, or Firm* — Muncy, Geissler, Olds & Lowe, P.C.

(57) ABSTRACT

A tool for welding a light pane to a housing of a motor vehicle light, the tool comprising a base body and at least one heating element arranged on the base body, wherein the heating element is displaceable relative to the base body between an idle position and a welding position.

12 Claims, 3 Drawing Sheets

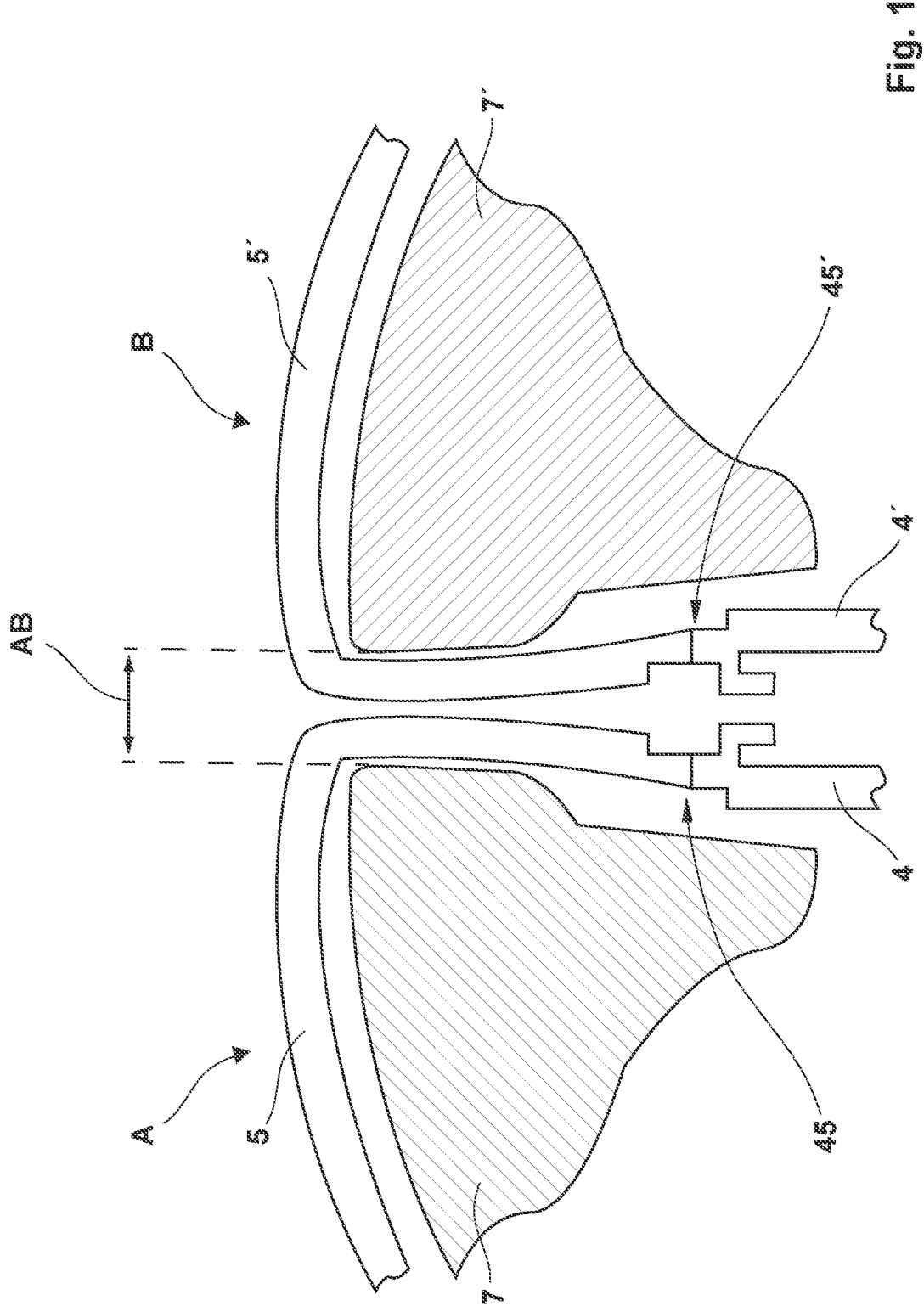

TOOL FOR WELDING A LIGHT PANE TO A HOUSING OF A MOTOR VEHICLE LIGHT

This nonprovisional application is a continuation of International Application No. PCT/EP2020/067832, which was filed on Jun. 25, 2020, and which claims priority to German Patent Application No. 10 2019 117 950.5, which was filed in Germany on Jul. 3, 2019, and which are both herein incorporated by reference.

BACKGROUND OF THE INVENTION

Field of the Invention

The present invention relates to a tool for welding a light pane to a housing of a motor vehicle light, said tool comprising a base body and at least one heating element arranged on the base body.

Description of the Background Art

Housings and light panes of motor vehicle lights are usually fabricated of thermoplastics today and joined to one another, for example, by means of hot plate welding. This joining process is described, for example, in DVS guideline 2215-1 "Heated tool welding of moldings made of thermoplastics in series fabrication." The functional principle is based on plasticizing the joining surfaces of the molded parts with a heating element by contact or without contact by means of heat radiation and then, after the heating element is removed, welding them together under a joining pressure.

For example, DE 10 2016 109 985 A1 discloses a method for welding a light pane to a housing of a motor vehicle light, for which at least one joining area of the light pane and at least one joining area of the housing are heated by application of heat in order to produce a melting state of the materials of the light pane and the housing in the joining areas, wherein the heat is applied by irradiating the joining areas by infrared radiation and welding is carried out with the applied heat.

In prior art methods and devices, welding tools are usually used which consist of an approximately plate-shaped base body with heating elements arranged on the top and bottom sides, wherein the heating elements each reproduce the contour of one of the joining surfaces to be heated. A welding tool of this kind is positioned in a joining plane between the joining partners, which are received in receiving tools, in order to warm the joining surfaces. The two receiving tools are usually each arranged on a lifting device, by means of which the held joining partners are moved in straight lifting movements into a warming position at the heating elements of the welding tool. In the warming position, the joining surfaces and the heating elements have the optimal working distance for plasticizing the joining surfaces by means of thermal radiation or are brought into physical contact in the case of a heating process based on contact of the joining surfaces with the heating elements.

Disadvantages of using welding tools of this kind according to the prior art are therefore the associated limitations with regard to the shape of the joining partners and the arrangement of their joining surfaces. For example, it is not possible in this case to warm a joining surface arranged in an undercut by means of the heating elements, because when the corresponding joining partner approaches the welding tool, there is inevitably a physical contact between the heating element and the section of the joining partner obscuring the undercut, so that the heating element and joining partner cannot be brought into the position to one another necessary for warming the joining surface. Particularly in the case of multi-part automotive rear lights, there are increasingly design demands for a negligibly small gap dimension between the individual light segments, so that the most homogeneous light impression possible results in the warm image, so that lighting elements accommodated in the light housing are arranged in the immediate vicinity of the circumferential joining surface between the housing and the light pane, which also results in a great negative impact with regard to the accessibility of the housing-side joining surface for a welding tool according to the prior art.

SUMMARY OF THE INVENTION

It is therefore an object of the present invention to provide a method and a device by means of which the aforementioned disadvantages of the prior art are overcome and in particular welding of a light pane to a light housing is possible with greatly restricted accessibility of the joining surfaces.

The invention includes the technical teaching that the heating element is arranged displaceable between an idle position and a heating position on the base body of the welding tool.

The invention in this case is based on the idea of creating an additional translational degree of freedom by means of the displaceable arrangement of the heating element on the welding tool so that, in combination with the straight lifting movement of a receiving tool known from prior art welding devices, joining surfaces in undercuts or in otherwise geometrically restricted arrangements on the joining partner can also be brought into a suitable warming position relative to the heating element. With respect to the lifting axis of the receiving tool, hereinafter referred to as the z-axis, the displacement direction of the displaceable heating element can be oriented, for example, at right angles or at an oblique angle, or it can be advantageous to combine a right-angled displacement direction with a heating element protruding at an oblique angle from the base body of the welding tool. Technically, when the receiving tool is advanced into the warming position, the displaceable heating element is left in its idle position, for example, which is characterized by the fact that the heating element cannot collide with a section of the associated joining partner in this position during the advance of the receiving tool. In particular, in comparison with the heating position, the idle position can be laterally spaced further apart from the associated joining surface. After the warming position of the receiving tool is reached, the heating element can be moved into the heating position, wherein the joining partner sections overlapping the associated joining surface along the z-axis can be bypassed by such a lateral approach of the displaceable heating element.

The heating element can comprise a guide body and a heating resistor accommodated thereon, wherein the guide body is arranged displaceable on the base body, and wherein the guide body has an angled and/or curved shape. In this embodiment, a further adaptation of the welding tool to complex-shaped joining partners with joining surfaces that are difficult to access can be realized by the geometric design of the guide body; for example, a guide body with an L-shaped cross section can be suitable for addressing a joining surface in an undercut.

For example, the welding tool for moving the heating element can comprise a pneumatic cylinder or a servomotor, which is arranged in a suitable manner on the base body and can move the heating element between the idle and heating position.

The base body can have a substantially plate-shaped design with a bottom side, wherein a z-direction is defined by the surface normal of the bottom side and an x-direction is defined by a tangent to the bottom side, and wherein the heating element is arranged on the bottom side and is displaceable in a displacement direction, wherein the displacement direction corresponds to the x-direction, or wherein the projection of the displacement direction onto the x-direction and onto the z-direction has non-vanishing components. When such a welding tool is used in a suitable device, the z-direction is oriented collinear to the z-axis of the lifting device. The displacement of the heating element takes place, for example, tangentially to the bottom side of the base body, for which purpose, for example, corresponding rails for movably receiving the guide body of the heating element can be provided on the base body.

It can be advantageous furthermore to combine displaceable and rigid heating elements, known from the prior art, with one another on a welding tool. In the aforementioned embodiment, a second heating element can be accommodated on the bottom side of the base body, wherein the contour of a joining surface of a light housing is reproduced in combination by the displaceable heating element in the heating position and the second heating element. This is expedient if the accessibility of the joining surface of the housing is only partially impeded, whereas the remaining sections can be approximated to the required working distance for heating by a purely linear approach along the z-direction using a heating element from the prior art.

A third heating element, by means of which the contour of a joining surface of the light pane can be reproduced, is arranged on a top side of the plate-shaped base body opposite the bottom side. By means of such a welding tool, a light housing with a joining surface that is difficult to access at least in sections can be welded to a light pane.

The bottom side of the plate-shaped base body can have an inclined partial surface, wherein the projection of the surface normal of the partial surface onto the x-direction and onto the z-direction has non-vanishing components, and wherein the displaceable heating element is accommodated on the partial surface. The purpose of such a construction is to hold the displaceable heating element by gravity in its idle position or to move it there. For this purpose, the welding tool of the invention is positioned in a welding device such that the force of gravity acts along the z-direction, therefore, such that the bottom side of the plate-shaped base body faces the ground. Accordingly, the inclined partial surface on which the displaceable heating element is accommodated is oriented such that the heating element has a shorter distance from the ground in the idle position than in the heating position. In the absence of further forces, the heating element is accordingly accelerated in the direction of the idle position or held there by gravity.

The invention further relates to a device for welding a light pane to a housing of a motor vehicle light, said device at least comprising: a lower receiving tool for the light housing, an upper receiving tool for the light pane, a welding tool of the invention in one of the aforementioned embodiments with a plate-shaped base body, one lifting device each for moving the lower receiving tool and the upper receiving tool into a warming position and into a welding position, and a device for moving the welding tool into a joining plane between the first receiving tool and the second receiving tool. In this regard, the lifting device works along the z-axis and the welding tool is moved laterally, i.e., along an axis that is essentially orthogonal to the z-axis.

The device preferably comprises a welding tool in the aforementioned embodiment with an inclined partial surface, and the lower receiving tool comprises a rigid connecting piece which is designed to move the displaceable heating element on the welding tool into the heating position when the lower receiving tool is moved into the warming position. When the lower receiving tool is advanced, the connecting piece comes into physical contact with the heating element which is in the idle position and carries it along with the further advance, wherein the heating element is then in the heating position precisely when the lower receiving tool has assumed the warming position.

The invention relates further to a method for welding a light pane to a housing of a motor vehicle light by means of a device of the invention, said method comprising at least the following method steps: receiving the housing in the lower receiving tool in a starting position and the light pane in the upper receiving tool, moving the welding tool into the joining plane between the housing and the light pane, wherein the bottom side of the base body faces the joining surface of the housing, the top side of the base body faces the joining surface of the light pane, and the displaceable heating element is in the idle position, raising the lower receiving tool and lowering the upper receiving tool into the respective warming position, moving the displaceable heating element into the heating position, warming and plasticizing the joining surfaces of the housing and the light pane by means of the heating elements, moving the displaceable heating element into the idle position, lowering the lower receiving tool and raising the upper receiving tool out of the respective warming position, retracting the welding tool, raising the lower receiving tool and lowering the upper receiving tool into the welding position in which the joining surfaces of the housing and the light pane are pressed against one another under a joining pressure, and waiting for the joining surfaces to cool down, lowering the lower receiving tool and raising the upper receiving tool out of the welding position, and removing a welded unit comprising the housing and the light pane.

When a welding device with a rigid connecting piece on the lower receiving tool is used, the moving of the heating element into the heating position takes place simultaneously during the raising of the lower receiving tool into the warming position, and the moving of the heating element into the idle position takes place by means of gravity during the lowering of the receiving tool. As an alternative to such a gravity-based positioning, a moving via a connecting piece with pneumatic or spring-loaded return can preferably also be used.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a cross-sectional view through a section of a two-part rear light with welding joints with limited access;

DETAILED DESCRIPTION

Figure 2A:
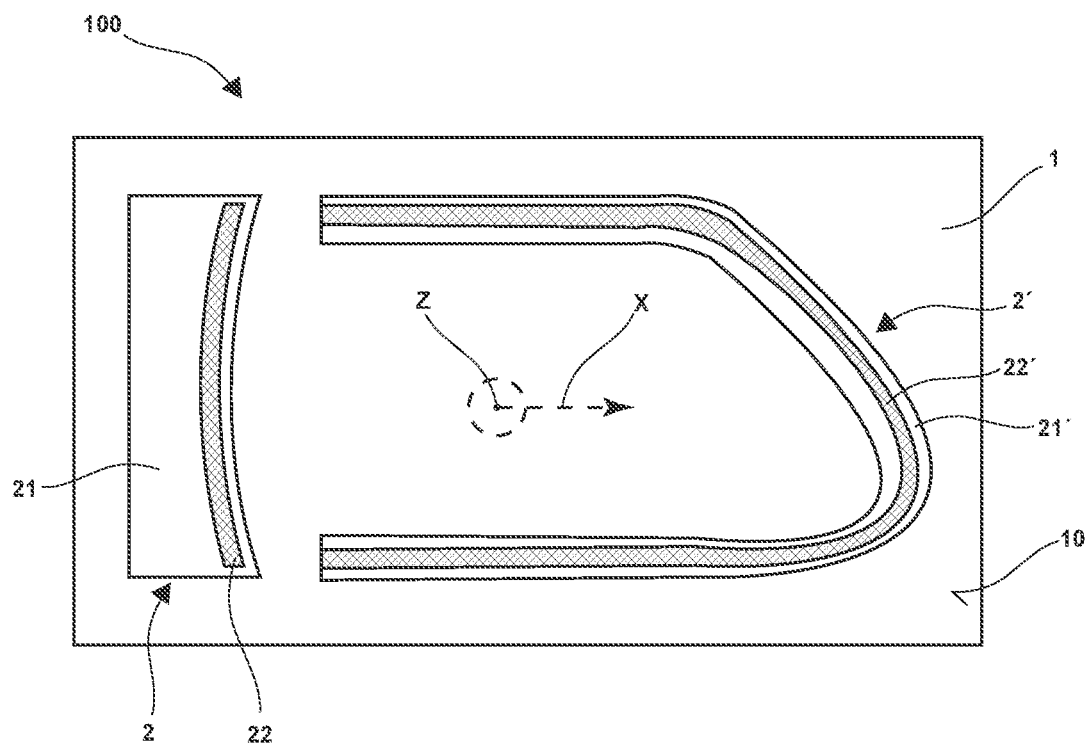
FIGS. 2a and 2b show plan views of a welding tool of the invention.

In order to illustrate the object on which the invention is based, FIG. 1 shows a cross-sectional view through a section of a two-part rear light with welding joints 45, 45' with limited access. The two-part rear light comprises fender light A and trunk lid light B, each of which has a light housing 4, 4', a light pane 5, 5', and a lighting component 7, 7'. The sections of light panes 5, 5', extending at the top in the plane of the drawing, represent the back end of rear light segments A and B; the cross section shown in FIG. 1 therefore shows a horizontal sectional plane.

In modern rear lights, there are design requirements for the smallest possible distance AB between the light functions, so that in the warm image of the rear light, i.e., when the light functions are turned on, the light impression is as spatially homogeneous as possible and also does not have a highly visible interruption in the transition area between fender light A and trunk lid light B. To minimize the distance AB, lighting components 7, 7' should be disposed in housings 4, 4' such that in the area of light panes 5, 5' they almost come into physical contact with light panes 5, 5'.

Welding joints 45, 45' between housings 4, 4' and light panes 5, 5' would thus be almost covered by lighting components 7, 7'. The distance between welding joints 45, 45' and the rearward sections of light panes 5, 5', extending at the top in the plane of the drawing, is typically up to 40 mm in order to ensure visibility of the light functions even when the rear light is viewed from the side. When the joining surfaces are plasticized by means of thermal radiation, the distance between the joining surfaces in welding joints 45, 45' shown here and the heating elements used is typically 2 mm. Infrared heating elements according to the prior art comprise a wire-shaped or band-shaped heating resistor which is accommodated in a guide body. The thickness of such heating elements is substantially greater than the thickness of light panes 5, 5'. Thus, in the case shown, severe limitation of the accessibility of the housing-side joining surfaces for a corresponding heating element arises due to the protruding lighting components 7, 7', even when a welding process based on contactless heating is used. Moving a heating element toward the housing-side joining surfaces by means of a straight lifting movement along a direction running vertically from top to bottom in the plane of the drawing, as is common in prior art welding devices, would not be possible here up to the required working distance of about 2 mm, because a collision of the heating element with sections of a lighting component 7, 7', said sections protruding beyond the joining surfaces, would occur first. Consequently, welding joints 45, 45', shown in FIG. 1, cannot be produced with welding tools or welding devices from the prior art; the object underlying the present invention is derived from this fact.

Figure 2B:
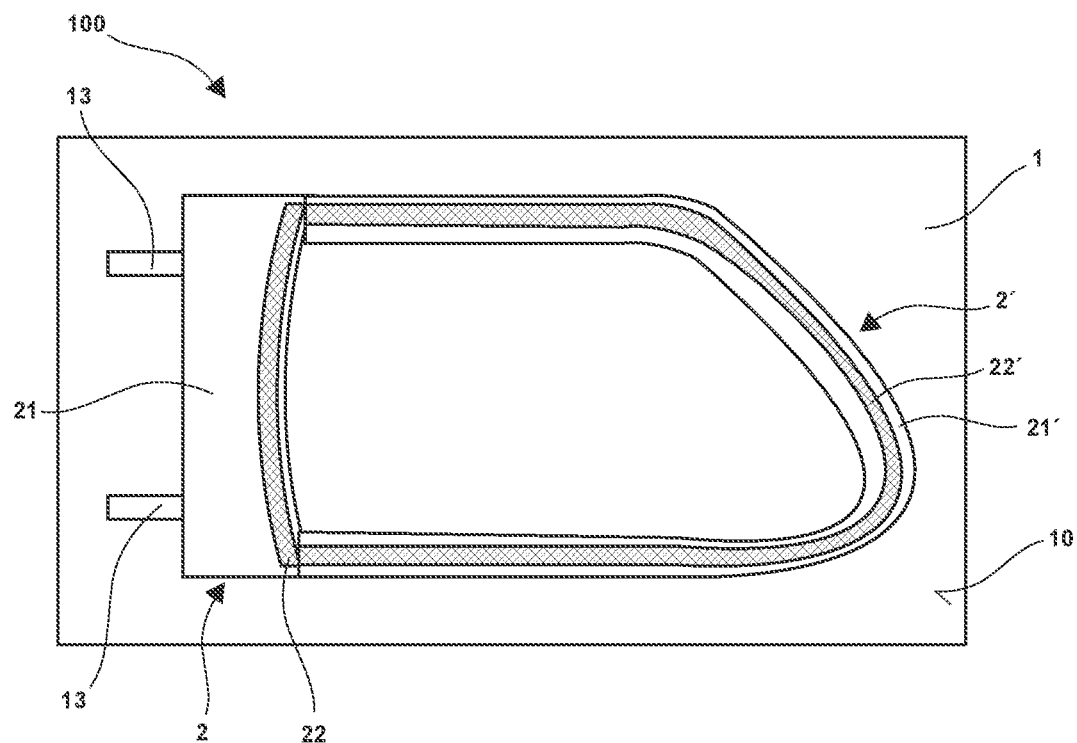

FIGS. 2a and 2b show top views along the z-direction z of bottom side 10 of a welding tool 100 of the invention, which comprises the plate-shaped base body 1 as well as displaceable heating element 2 and rigid heating element 2'. Heating elements 2, 2' comprise guide bodies 21, 21' and heating resistors 22, 22' accommodated thereon. Heating resistors 22, 22' formed here of corrugated, metallic strips with typical dimensions of 4 mm wide and 0.8 mm thick, which are designed to emit medium-wave infrared radiation when energized. Heating resistors 22, 22' are embedded in suitably dimensioned recesses on the end face of guide bodies 21, 21'. The cross section of guide body 21' of rigid heating element 2' can be formed rectangular or trapezoidal; its flank height, i.e., the distance in the z-direction z between heating resistor 22' and the bottom side 10 of base body 1, is up to 50 mm. The cross section of guide body 21 of displaceable heating element 2 is L-shaped, wherein in the view shown here the bottom side of one leg of the "L" can be seen. Heating element 2 can be displaced along the x-direction x, for which purpose guide body 21 is received, for example, on rail-like sliding guides 13 on bottom side 10 of base body 1.

FIG. 2a shows the position of displaceable heating element 2 in its idle position, in which heating element 2 is spaced apart from rigid heating element 2' in the x-direction x. In this position, in the method of the invention, the approach of welding tool 100 and the light housing to be welded takes place along the z-direction z. A lighting component part, disposed in the light housing (see FIG. 1) and protruding in sections over the joining surface, can pass without collision through the gap between displaceable heating element 2 and rigid heating element 2'.

FIG. 2b shows the position of displaceable heating element 2 in its heating position, in which heating element 2 abuts rigid heating element 2', so that the course of the two heating resistors 22, 22' simulates the contour of the joining surface of the light housing to be welded.

Figure 3A:
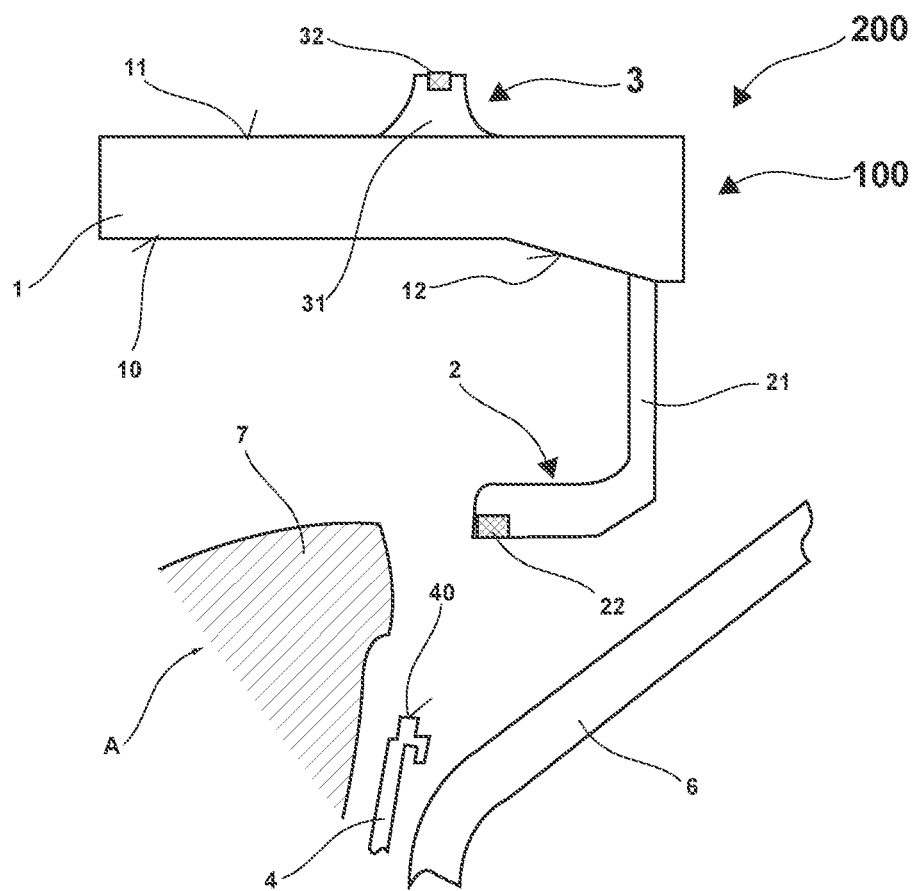
FIGS. 3a and 3b show cross-sectional views through sections of a device of the invention and a rear light housing accommodated thereon.
Figure 3B:
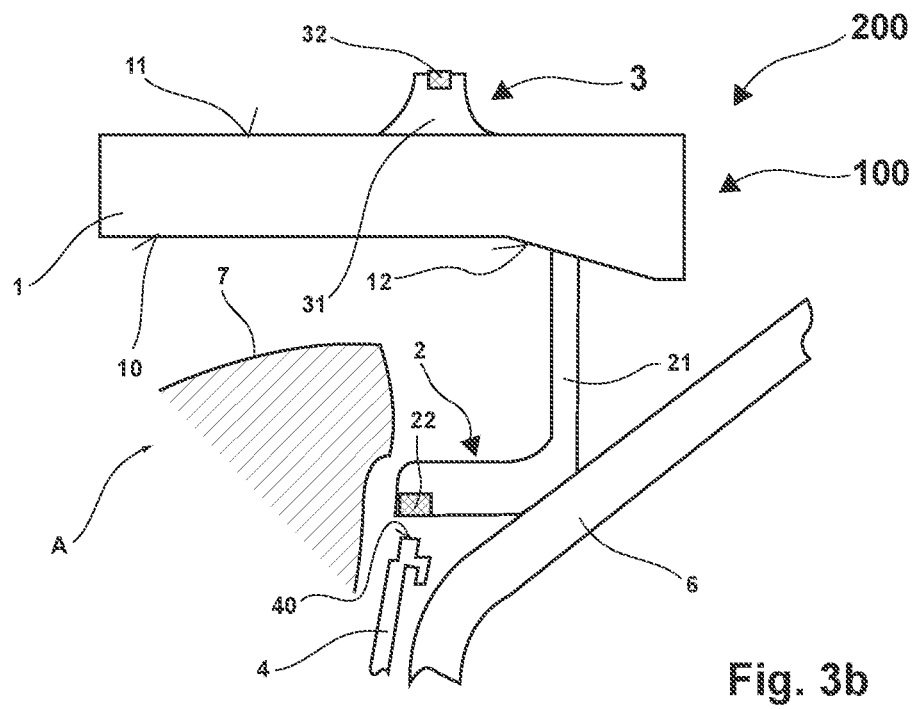

In FIGS. 3a and 3b, cross-sectional views through sections of a welding device 200 of the invention with a welding tool 100 and an accommodated housing 4 of a fender light A are shown. Welding tool 100 comprises the substantially plate-shaped base body 1, the bottom side 10 of which has the inclined partial surface 12 on which guide body 21 of heating element 2 is displaceably received. Upper heating element 3, comprising guide body 31 and heating resistor 32 and provided for warming the joining surface of an associated light pane, is arranged on top side 11 of base body 1. Welding tool 100 is located in the joining plane between housing 4 and the light pane. The light pane and the upper receiving tool, receiving it, of device 200 are not shown here. Housing 4 with lighting component 7 disposed therein is received in the lower receiving tool of device 200, the lower receiving tool not being shown here.

FIG. 3a shows the displaceable heating element 2 in the idle position, in which it is held by gravity. Joining surface 40 of housing 4 is brought closer to heating resistor 22 by means of a lifting movement along the z-direction z of the lower receiving tool, wherein rigid connecting piece 6, disposed on the lower receiving tool, is also moved accordingly in the z-direction z. Connecting piece 6 fulfills the function of a driver and from the point in time at which it comes into contact with guide body 21, heating element 2 is displaced along the inclined partial surface 12 when the lower receiving device is raised further. During the approach of housing 4 in the z-direction z, heating element 2 is therefore moved laterally to joining surface 40 by a simultaneous sliding movement with a movement component in the x-direction x, wherein the section of lighting component 7 protruding in the manner of a projection over joining surface 40 is more or less bypassed.

In FIG. 3b, the lower receiving tool is in the warming position and displaceable heating element 2 is in the heating position; i.e., joining surface 40 and heating resistor 22 are suitably spaced from one another in the z-direction z and suitably aligned with one another in the x-direction x so that the warming and plasticizing of joining surface 40 can take place. When the lower receiving tool is subsequently lowered, the contact between guide body 21 and connecting piece 6 is released, so that guide body 21 slides down the inclined partial surface 12 under the influence of gravity until the heating element has returned to the idle position. Accordingly, when the lower receiving tool is lowered, heating element 2 moves along the same trajectory as when it is raised, so that no collision can therefore occur between heating element 2 and the protruding lighting component 7 during lowering as well.

As an alternative to the use of a connecting piece 6 shown here, heating element 2 can also be displaced between the idle position and the heating position by means of a separate drive on welding tool 100, for example, by means of pneumatics or a servomotor.

The invention is not limited in its implementation to the preferred exemplary embodiment described above. Rather, a number of variants are conceivable which make use of the shown solution even in the case of fundamentally different embodiments. All features and/or advantages arising from the claims, the description, or the drawings, including structural details, spatial arrangements, and method steps, can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A tool for welding a light pane to a housing of a motor vehicle light, the tool comprising:
a base body; and
at least one heating element arranged on the base body,
wherein the heating element is displaceable relative to the base body between an idle position and a heating position,
wherein the base body has a substantially plate-shaped design with a bottom side, wherein a z-direction is defined by the surface normal of the bottom side and an x-direction is defined by a tangent to the bottom side, and wherein the heating element is arranged on the bottom side and is linearly displaceable in a displacement direction, wherein the displacement direction corresponds to the x-direction, or wherein the projection of the displacement direction onto the x-direction and onto the z-direction has non-vanishing components, and
wherein the bottom side of the base body has an inclined partial surface, wherein the projection of the surface normal of the partial surface onto the x-direction and onto the z direction has non-vanishing components, and wherein the heating element is accommodated on the inclined partial surface.

2. The tool according to claim 1, wherein a second heating element is accommodated on the bottom side, wherein the contour of a joining surface of the housing is reproduced by the heating element and the second heating element when the heating element is displaced into the heating position.

3. The tool according to claim 2, wherein the heating element is positioned closer to the second heating element in the heating position than when the heating element is in the idle position.

4. The tool according to claim 1, wherein the heating element comprises a guide body and a heating resistor accommodated thereon, wherein the guide body is arranged displaceable on the base body, and wherein the guide body has an angled and/or curved shape.

5. The tool according to claim 1, wherein the tool comprises a pneumatic cylinder or a servomotor, wherein the heating element is displaced via the pneumatic cylinder or via the servomotor.

6. The tool according to claim 1, wherein the heating element is slidably displaceable in the x-direction.

7. The tool according to claim 1, wherein a portion of the bottom side of the base body is flat and another portion of the bottom side of the base body has the inclined partial surface.

8. A tool for welding a light pane to a housing of a motor vehicle light, the tool comprising:
a base body; and
at least one heating element arranged on the base body,
wherein the heating element is displaceable relative to the base body between an idle position and a heating position, and
wherein the base body has a substantially plate-shaped design with a bottom side, wherein a z-direction is defined by the surface normal of the bottom side and an x-direction is defined by a tangent to the bottom side, and wherein the heating element is arranged on the bottom side and is linearly displaceable in a displacement direction, wherein the displacement direction corresponds to the x-direction, or wherein the projection of the displacement direction onto the x-direction and onto the z-direction has non-vanishing components,
wherein a second heating element is accommodated on the bottom side, wherein the contour of a joining surface of the housing is reproduced by the heating element and the second heating element when the heating element is displaced into the heating position, and
wherein a third heating element, via which the contour of a joining surface of the light pane is reproduced, is arranged on a top side of the base body opposite the bottom side.

9. A device for welding a light pane to a housing of a motor vehicle light, the device comprising:
a lower receiving tool for the housing;
an upper receiving tool for the light pane;
a welding tool;
a lifting device for moving the lower receiving tool and the upper receiving tool into a warming position and into a welding position; and
a device for moving the welding tool into a joining plane between the lower receiving tool and the upper receiving tool,
wherein the welding tool comprises a base body and at least one heating element arranged on the base body,
wherein the heating element is displaceable relative to the base body between an idle position and a heating position, and
wherein the base body has a substantially plate-shaped design with a bottom side, wherein a z-direction is defined by the surface normal of the bottom side and an x-direction is defined by a tangent to the bottom side, and wherein the heating element is arranged on the bottom side and is linearly displaceable in a displacement direction, wherein the displacement direction corresponds to the x-direction, or wherein the projection of the displacement direction onto the x-direction and onto the z-direction has non-vanishing components.

10. The device according to claim 9, wherein the lower receiving tool comprises a rigid connecting piece, the rigid connecting piece being the device for moving the welding tool into the joining plane, wherein rigid connecting piece moves the heating element on the welding tool into the heating position when the lower receiving tool is moved into the warming position.

11. A method for welding a light pane to a housing of a motor vehicle light by a device according to claim 10, the method comprising:
   receiving the housing in the lower receiving tool in a starting position and the light pane in the upper receiving tool;
   moving the welding tool into the joining plane between the housing and the light pane, wherein the bottom side of the base body faces a joining surface of the housing, an upper side of the base body faces a joining surface of the light pane, and the heating element is in the idle position;
   raising the lower receiving tool and lowering the upper receiving tool into the respective warming position, wherein the heating element is linearly moved into the heating position by the rigid connecting piece;
   warming and plasticizing the joining surfaces of the housing and the light pane by the heating element;
   lowering the lower receiving tool and raising the upper receiving tool out of the respective warming position, wherein the heating element is linearly moved into the idle position by means of gravity;
   retracting the welding tool;
   raising the lower receiving tool and lowering the upper receiving tool into the welding position in which the joining surfaces of the housing and the light pane are pressed against one another under a joining pressure, and waiting for the joining surfaces to cool down;
   lowering the lower receiving tool and raising the upper receiving tool out of the welding position; and
   removing a welded unit comprising the housing and the light pane.

12. A method for welding a light pane to a housing of a motor vehicle light by a device according to claim 9, the method comprising:
   receiving the housing in the lower receiving tool and the light pane in the upper receiving tool;
   moving the welding tool into the joining plane between the housing and the light pane, wherein the bottom side of the base body faces a joining surface of the housing, an upper side of the base body faces a joining surface of the light pane, and the heating element is in the idle position;
   raising the lower receiving tool and lowering the upper receiving tool into the respective warming position;
   linearly moving the heating element into the heating position;
   warming and plasticizing the joining surfaces of the housing and the light pane by the heating element;
   linearly moving the heating element into the idle position;
   lowering the lower receiving tool and raising the upper receiving tool out of the respective warming position;
   retracting the welding tool;
   raising the lower receiving tool and lowering the upper receiving tool into the welding position in which the joining surfaces of the housing and the light pane are pressed against one another under a joining pressure, and waiting for the joining surfaces to cool down;
   lowering the lower receiving tool and raising the upper receiving tool out of the welding position; and
   removing a welded unit comprising the housing and the light pane.

* * * * *